United States Patent Office 3,324,086
Patented June 6, 1967

3,324,086
POLYAMIDES CONTAINING FUSED
HETEROCYCLE UNITS
Jack Preston, Raleigh, N.C., assignor to Monsanto
Company, a corporation of Delaware
No Drawing. Filed Feb. 26, 1964, Ser. No. 347,382
10 Claims. (Cl. 260—78)

This invention relates to new high temperature resistant linear condensation polymers. More particularly, the invention relates to polymers with regularly recurring structural units containing amide linkages and fused heterocycles linkages.

Synthetic linear condensation polymers such as polyamides in the form of fibers, filaments, films, and other shaped articles have found wide application in textile and other industrial end uses requiring high tensile strength, abrasion resistance, and resistance to thermal and other degradative conditions. Subsequent searching for polymers of improved thermal resistance has produced various heterocycle polymers such as polyoxadiazoles, polybenzimidazoles, and polyimides. Typical of such polymers are those in U.S. Patents 2,895,948, 2,904,537 and 3,044,994. Such heterocycle polymers have certain characteristics, including heat resistance and resistance to acids and other degradative conditions, which are superior to those of polyamides in general. Wholly aromatic polyamides such as those of U.S. 3,006,899 and 3,049,518 have also been found to be highly resistant to high temperatures. This invention presents polymers which combine the desirable qualities and characteristics of both aromatic polyamides and heterocycle polymers.

Accordingly, it is an object of this invention to provide new compositions of matter and a process for their preparation.

Another object of this invention is the provision of novel amide-heterocycle polymers which are characterized by the fact that they have at least two heterocyclic linkages, fused in such a manner that the heterocycle rings share certain common ring members, and amide linkages in each repeating unit which appear in a perfectly regular sequence along the polymer chain, each amide and each pair of heterocyclic linkages which constitute structures containin fused 5 or 6 membered rings being separated by an aromatic radical, the polymers further being characterized by the fact that there is at least one point of symmetry in each repeating unit of the polymer.

It is a further object to provide polymers which are unusually thermally stable.

An additional object of the invention is the provision of fibers, filaments, films and other shaped articles prepared from the amide-heterocycle polymers of this invention.

Other objects and advantages will become apparent from the description of the invention which follows hereinafter.

This invention is concerned with the provision and preparation of "symmetrical" amide-heterocycle polymers having the formula

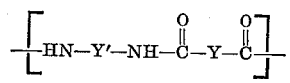

wherein Y and Y' are selected from Ar and Ar-X-Ar where Ar is an aromatic divalent radical which may have a single, multiple or fused structure, and X represents a structure containing two fused 5 or 6 ring membered heterocyclic rings which contain from one to three hetero elements such as N, S, P, As, O and Se. In the general formula Y and Y' may be the same or different provided that there is at least one Ar-X-Ar linkage in each repeating unit. In each Ar-X-Ar linkage both Ar's may have meta or para orientation, so long as both Ar's have the same orientation.

The use of the term "symmetrical" herein is intended to relate to a characteristic of the polymers of this invention which may be described by the fact that there is at least one point of symmetry in each repeating unit of the polymers. For example, repeating units may be shown as follows:

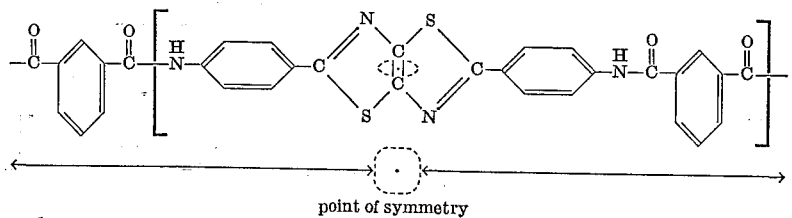

point of symmetry and

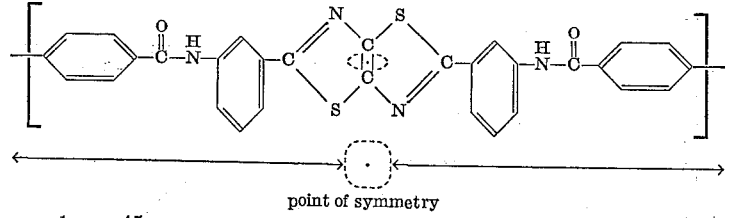

point of symmetry wherein a point of symmetry is indicated and wherein it is shown that the repeating units consist of corresponding portions all segments of which lie equidistant from the point of symmetry.

The heterocyclic linkages are exemplified by

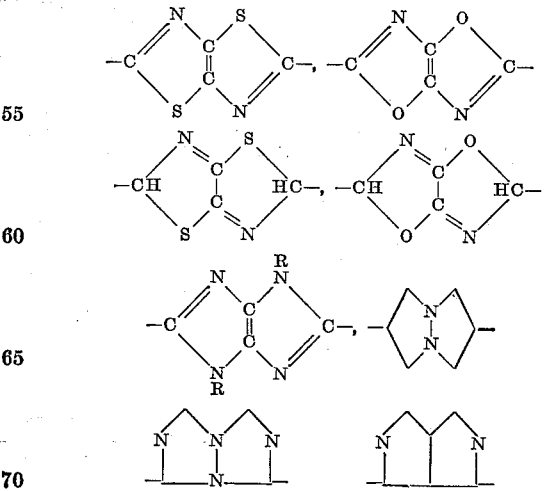

where R=H, lower alkyl, or phenyl.

Suitable aromatic linkages include:

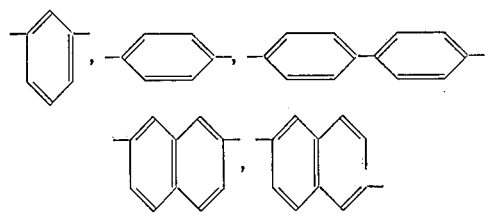

and

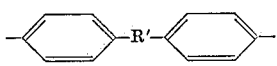

where R' is —O—, —S—, —SO$_2$—, and the like.

As examples of the polymers of this invention the following may be cited:

The polymers of this invention may be prepared by reacting together two monomers, each containing functional groups which react with the functional groups of the other to produce a polymer containing amide and two or more fused heterocyclic linkages in each repeating unit which appear in a perfectly regular sequence along the polymer chain. Thus, the polymers may be prepared via the reaction of an aromatic diacid chloride with an aromatic diamine containing two fused heterocyclic linkages or from the reaction of an aromatic diacid chloride containing two fused heterocyclic linkages with an aromatic diamine. An alternate route to the polymers of this invention employs the reaction of a monomer containing preformed amide linkages and functional groups which, when reacted with the functional groups of a second monomer, produce the fused heterocyclic linkages. The polymerization of the reactants is a condensation reaction which may be conveniently conducted by interfacial or solution polymerization methods, by heating of stoichiometric amounts of reactants and the like.

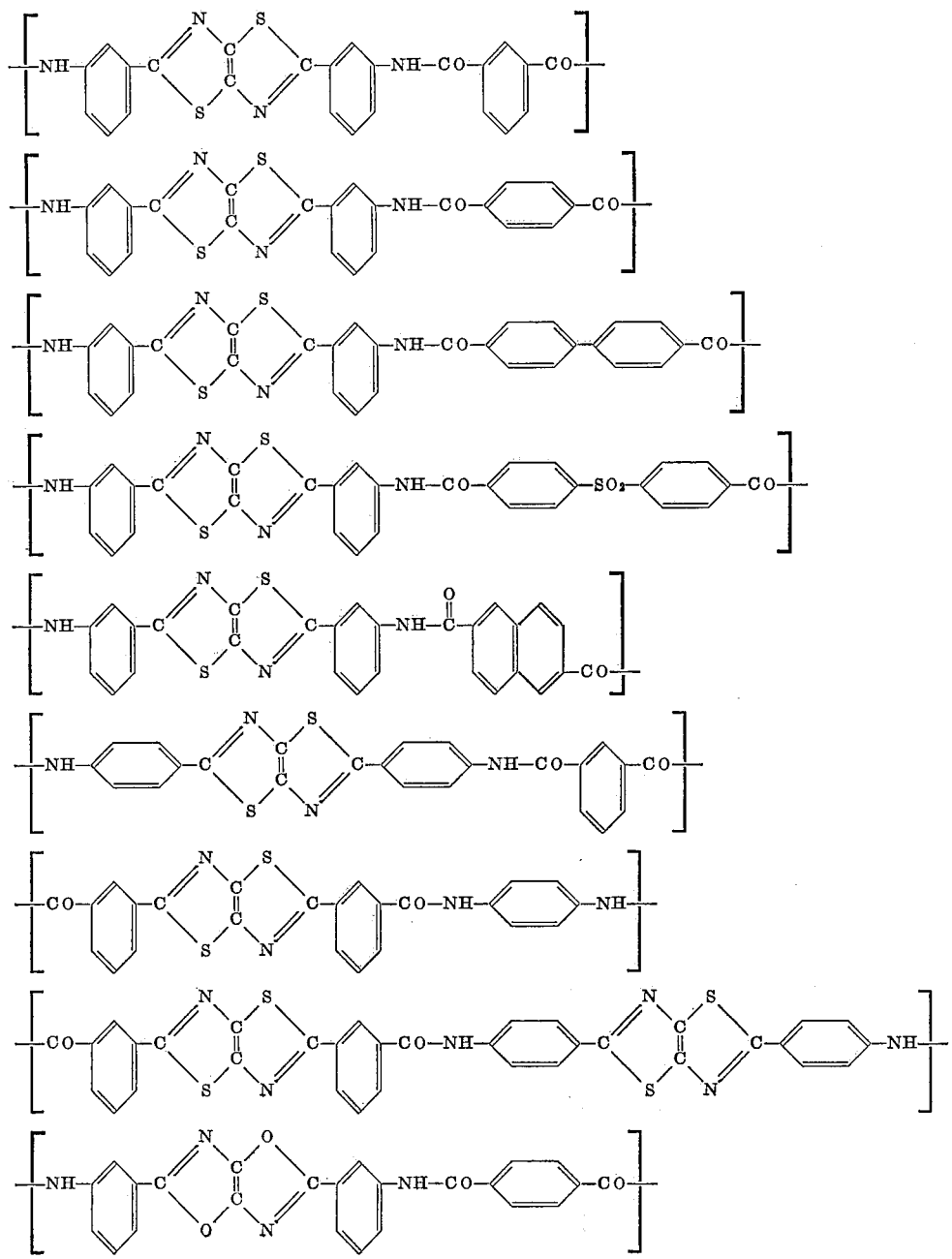

The following equations are exemplary of how the polymers of the invention can be prepared:

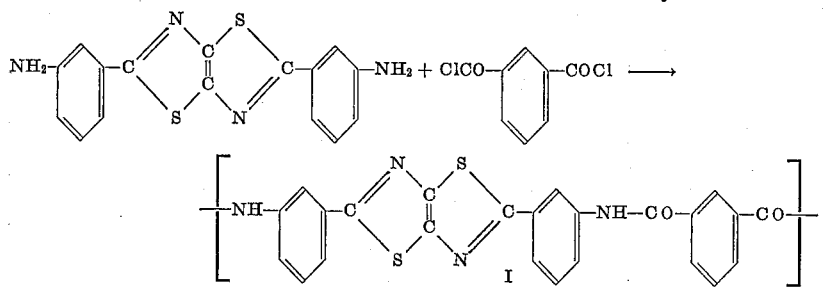

or

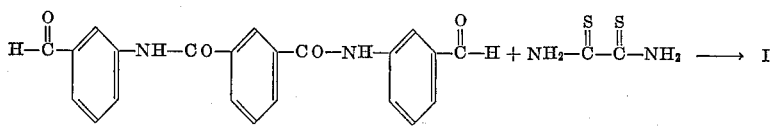

Of the several routes to the preparation of the polymers of this invention, the polymerization of an aromatic diamine containing two fused heterocyclic linkages, is typical.

As examples of the diamines which may be used in the practice of this invention, the following are typical and illustrative.

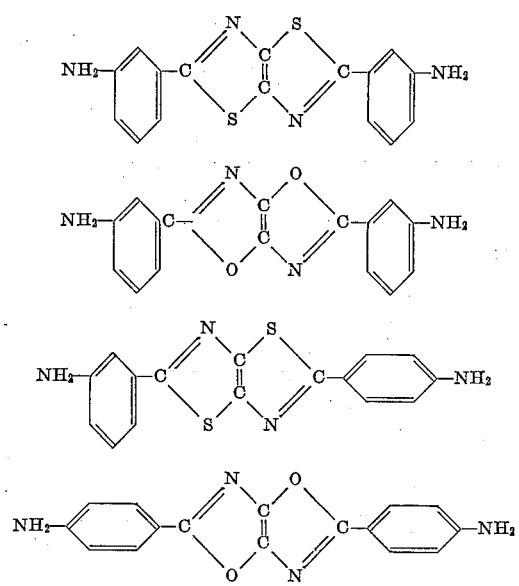

The method of preparation of the diamines of this invention, in general, is described by J. R. Johnson and R. Ketcham, J. Am. Chem. Soc. 82, 2719 (1960). Conveniently it involves the preparation of dinitro intermediates which are then reduced to the diamine compounds containing the fused heterocycle linkages.

The dinitro intermediate may be prepared by the reaction of a nitrobenzaldehyde and dithiooxamide (rubeanic acid) at elevated temperatures, in a solvent or in a melt.

The reduction of the dinitro intermediate to the diamine may be effected by use of catalytic reducing methods such as those involving the use of a palladium on charcoal catalyst typically employing 5 percent palladium on charcoal, a Parr hydrogenation unit or other unit. The reduction may also employ Raney nickel, cobalt and other similar heavy metal catalysts, these catalyst systems usually being effected in an alcohol or in solution in dimethyl formamide or similar compounds. Reduction may also be accomplished using chemical reduction methods, such as stannous chloride and hydrochloric acid, iron and sulfuric acid, polysulfide solutions and the like.

Suitable dicarboxylic acids or diacid derivatives which may be used in the practice of the invention include all diacid compounds where the carbonyl radicals are joined by aromatic or heterocyclic aromatic linkages, for example, aromatic diacid halides, such as isophthaloyl halide and substituted isophthaloyl chlorides such as alkyl, aryl, alkoxy, nitro and other similar isophthaloyl chlorides and isophthaloyl bromides. Examples of such compounds include 4,6-dimethyl-5-propyl isophthaloyl chloride, 2,5-dimethyl isophthaloyl chloride, 2,5-dimethoxy isophthaloyl chloride, 4,6-dimethoxy isophthaloyl chloride, 2,5-diethoxy isophthaloyl chloride, 5-propoxy isophthaloyl chloride, 5-phenyl isophthaloyl chloride, 2-methyl-5-phenyl isophthaloyl chloride, 2,5-dinitro isophthaloyl chloride, 5-nitro isophthaloyl chloride and the like. Terephthaloyl chloride or terephthaloyl bromide may also be used and may be substituted in the manner described above for isophthaloyl chloride. Examples of terephthaloyl chlorides include 2,6-dimethyl terephthaloyl chloride, tetramethyl terephthaloyl chloride, 2-methoxy terephthaloyl chloride, 2-nitro terephthaloyl chloride and the like.

These diacid monomers may be prepared by any of the well known prior art methods used to prepare aromatic diacid compounds. For example, oxidation of xylenes.

The polymers of the invention may be obtained by any of the well known condensation polymerization techniques such as solid state, melt, interfacial or solution polymerization techniques.

The solution polymerization method generally involves dissolving the diamine in a suitable solvent which is inert to the polymerization reaction. Among such solvents there may be mentioned dimethylacetamide, 1-methyl-2-pyrrolidone, 1,5-dimethyl-2-pyrrolidone and the like. These solvents are rendered more effective in many instances by mixing them with a small amount, up to 10 percent, of an alkali or alkaline earth salt such as lithium chloride, lithium bromide, magnesium bromide, magnesium chloride, beryllium chloride, or calcium chloride. The preferred solvent for solution polymerization is dimethylacetamide or dimethylacetamide containing a small amount of dissolved lithium chloride. The diamine solution is cooled to between 20 and −30° C. and the dicarbonyl monomer is added either as a solid or in a solution of one of the aforementioned solvents. The mixture is then stirred for a period of time until polymerization is substantially complete and high viscosity is attained. This highly viscous solution may be spun per se or the polymer may be isolated by pouring the mixture in a non-solvent, washing and drying the polymer and then preparing the spinning solution.

The interfacial polymerization reaction is conducted by mixing water, an emulsifier and the diamine which may be in the form of its dihydrochloride. A proton acceptor is then added and the mixture is then stirred rapidly. During this rapid stirring a solution of the dicarbonyl monomer in an inert organic solvent is added, the mixture is stirred until polymerization is complete, the polymer is then isolated by filtration and is washed and dried. The dicarbonyl monomer solvent may be any convenient solvent such as cyclic nonaromatic oxygenated organic solvent such as a cyclic tetramethylene sulfone, 2,4-dimethyl cyclic tetramethylene sulfone, tetrahydrofuran, propylene oxide and cyclohexanone. Other suitable dicarbonyl monomer solvents include chlorinated hydrocarbons such as methylene chloride, chloroform and chlorobenzene, benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

The amounts of the various reactants which may be employed will, of course, vary according to the type of polymer desired. However, in most instances, substantially equimolar quantities or a slight excess of diamine to dicarbonyl may be used. For interfacial polymerization reactions, sufficient proton acceptor to keep the acidic by-products neutralized may be added, the exact amount easily determined by one skilled in the art.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like.

A proton acceptor as the term is employed herein indicates a compound which acts as an acid scavenger to neutralize HCl, formed during the reaction, and which aids to carry the reaction to completion. Suitable proton acceptors include sodium carbonate, magnesium carbonate, calcium carbonate, tertiary amines such as triethyl amine, trimethyl amine, tripropyl amine, ethyl dimethyl amine, tributyl amine and similar compounds which react as desired.

The products of this invention are useful in a wide range of applications. In the form of fibers, filaments and films the polymers of this invention are thermally resistant as well as being resistant to acids and other types of chemical degradation.

The invention is further illustrated by the following examples in which all parts and percents are by weight unless otherwise indicated.

*Example I.—Preparation of bis-(3-aminophenyl)-thiazolo [5,4-d]thiazole*

A solution of 61.0 g. (0.4 mole) m-nitrobenzaldehyde and 24 g. (0.2 mole) dithiooxamide in 100 ml. dimethylacetamide (DMAc) was heated to reflux and held at reflux for 30 minutes. The reaction mixture was cooled to 75° C. and the precipitate was collected. The crude product, 36.9 g. (M.P. 314–317° C.), was recrystallized from 800 ml. of nitrobenzene to yield 28.9 g. of product, M.P. 320–322° C.

*Analysis.*—Calculated: C. 50.00; H, 2.10; N, 14.58. Found: C, 50.05, 50.13; H, 2.35, 2.40; N, 14.01. 14.27.

A 14 g. portion of the above product, 1 g. Raney nickel, and 300 ml. DMAc was placed in a rocking bomb. The bomb was pressured with hydrogen to 3000 p.s.i., heated to 120° C. and held at 120° C. for 3 hours, then cooled. The contents of the bomb were filtered and the filtrate was poured into 1.5 liters of water at 70° C.; the product was collected and dried at 50° C. in a vacuum oven. The yield of crude

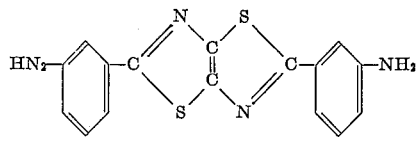

(diamine A) was 11.8 g., M.P. 258–268° C. Recrystallization from 500 ml. of ethyleneglycol monomethyl ether gave 7.5 g. of pure product, M.P. 287–289° C.; a second crop of crystals was obtained by pouring the mother liquor into 1.5 liers of water.

*Analysis.*—Calculated: C, 59.25; H, 3.73; N, 17.27. Found: C, 59.04, 59.04; H, 3.82, 3.99; N, 16.74, 16.79.

*Example II.—Polyamides of bis-(3-aminophenyl)-thiozolo[5,4]thiozole*

The polymers of this example have the following structures:

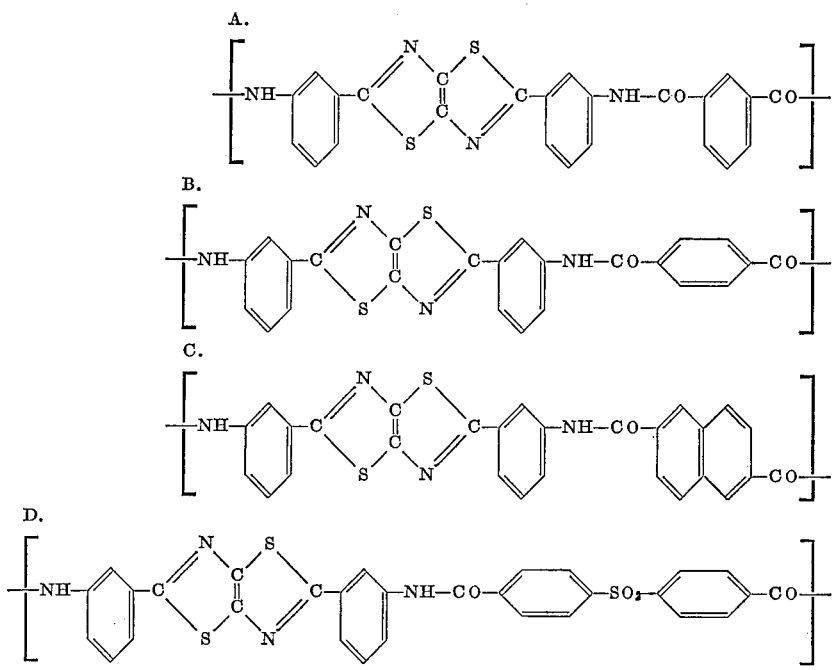

A. A solution of 1.62 g. (0.005 mole) diamine A in 7 ml. DMAc containing 5% dissolved lithium chloride was cooled to −30° and 1.02 g. (0.005 mole) isophthaloyl chloride added with stirring. After 15 minutes the solution was allowed to warm to 0° C. and after 15 minutes at 0° C. the solution was allowed to warm to room temperature. The solution was neutralized by the addition of 0.24 g. LiOH and the very viscous solution was diluted by the addition of 7 ml. DMAc. Excellent films of high thermal stability (softening point >300° C.) were cast from solution.

B. A solution of 1.62 g. (0.005 mole) diamine A in 5 ml. DMAc containing 6% dissolved lithium chloride was cooled to —30° C. and 1.02 g. (0.005 mole) terephthaloyl chloride was added with stirring. The reaction mixture was allowed to warm to room temperature, stirred overnight, then precipitated in water, collected and dried. The melting point of the polymer was in excess of 300° C.

C. The procedure of B was repeated except that 2,6-naphthalenedicarbonyl chloride was used.

D. The procedure B was repeated using 0.81 g. (0.0025 mole) diamine A, 0.86 g. (0.0025 mole) 4,4'-sulfonebibenzoyl chloride, and 3 ml. DMAc containing 5% dissolved lithium chloride. The resulting polymer remained in solution.

*Example III.—Preparation of bis-(4-aminophenyl)-thiazolo[5,4-d]thiazole*

A solution of 61.0 g. (0.4 mole) p-nitrobenzaldehyde and 24 g. (0.2 mole) dithioxamide was refluxed for 1 hour 30 minutes, cooled and filtered. The crude product was washed twice with ethanol and dried; the yield of crude product was 38.6 g. The product was washed twice with hot dimethylacetamide and dried to yield 33.2 g. of purified product. Pure

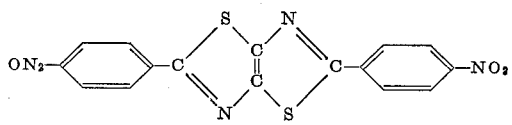

was obtained by recrystallization from nitrobenzene.

*Analysis.*—Calculated: C, 50.00; H, 2.10; N, 14.58. Found: C, 50.12, 50.38; H, 2.23, 2.35; N, 14.51, 14.53.

An aminco hydrogenation apparatus was charged with 14.5 g. of the above dinitro compound, 1.5 g. Raney nickel, and 300 ml. DMAc. The system was pressured to 2500 p.s.i. with hydrogen, and the system heated to 120° C. The bomb was rocked for 3½ hours, then the system allowed to cool overnight under pressure. After the catalyst was filtered off, the filtrate was poured into 1.5 liters of water at 80° C.; the precipitate was collected and dried to yield 8 g. of crude

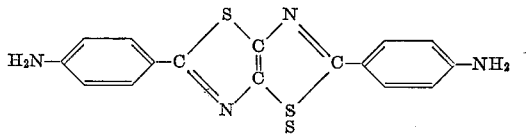

diamine B), M.P. 294–304° C. Recrystallization from ethyleneglycol monomethyl ether gave a product of M.P. 299–303° C.

*Analysis.*—Calculated: C, 59.25; H, 3.73; N, 17.27. Found: C, 59.00, 59,17; H, 3.83, 3.96; N, 16.82, 16.84.

*Example IV*

The polymer of this example has the following structure:

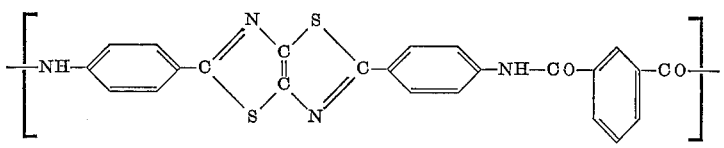

A mixture of 1.30 g. (0.004 mole) of diamine B and 4 ml. of DMAc containing 6% dissolved lithium chloride was cooled to —30° C. and 0.81 g. (0.004 mole) isophthaloyl chloride was added with stirring. The solution of polymer was allowed to warm to 0° C., then after 10 minutes at 0° C., to room temperature. After neutralization with 0.19 g. LiOH, 14 ml. DMAc containing 6% dissolved lithium chloride was added and the contents of the flask was heated to 90° C. A film cast from the reaction mixture was very thermally stable with a softening point above 400° C.

As many widely different embodiments of this invention may be made without departing from the spirit and scope thereof, it is to be understood that the invention is not to be limited by the specific embodiments set forth herein but only by the claims which follow.

I claim:

1. An amide-heterocyclic polymer composed of regularly recurring structural units of the formula

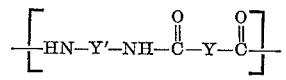

wherein Y and Y' are selected from the group consisting of Ar and Ar-X-Ar where Ar is a hydrocarbon aromatic divalent radical oriented other than ortho, X represents a divalent heterocyclic radical which consists of two fused 5 to 6 member heterocyclic rings which contain from 1 to 3 hetero elements selected from the group consisting of N, S, P, As, O and Se, all occurrences of X in the recurring unit must be the same, and wherein at least one Ar-X-Ar radical must be present in each repeating unit, and wherein there is at least one point of symmetry in each regularly recurring structural unit.

2. A fiber forming amide-heterocyclic polymer composed of regularly recurring structural units of the formula

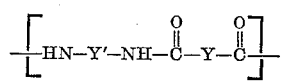

wherein Y and Y' are selected from the group consisting of Ar and Ar-X-Ar where Ar is a hydrocarbon aromatic divalent radical oriented other than ortho and containing from 6 to 15 carbon atoms, X represents a divalent heterocyclic radical which consists of two fused 5 to 6 member heterocyclic rings which contain from 1 to 3 hetero elements selected from the group consisting of N, S, P, As, O and Se, all occurrences of X in the recurring unit must be the same, and wherein there is at least one point of symmetry in each regularly recurring structural unit.

3. An amide-heterocyclic polymer composed of regularly recurring structural units of the formula

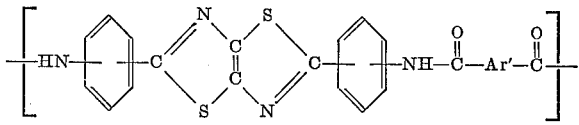

wherein Ar' is selected from the group consisting of

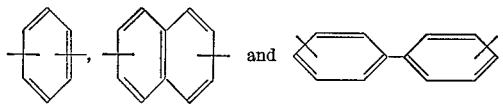

4. An amide-heterocyclic polymer composed of regularly recurring structural units of the formula

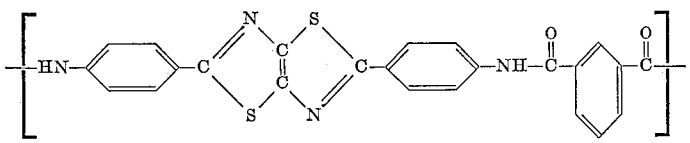

5. An amide-heterocyclic polymer composed of regularly recurring structural units of the formula

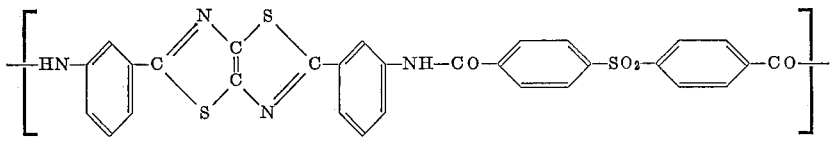

6. An amide-heterocyclic polymer composed of regularly recurring structural units of the formula

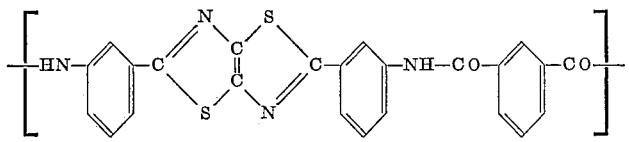

7. An amide-heterocyclic polymer composed of regularly recurring structural units of the formula

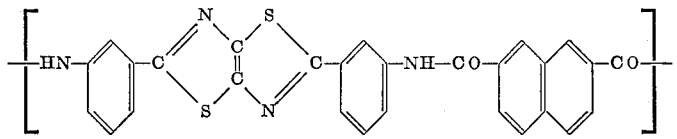

8. An amide-heterocyclic polymer composed of regularly recurring structural units of the formula

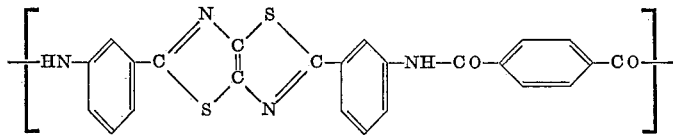

9. The polymer of claim 1 in the form of a fiber.
10. The polymer of claim 1 in the form of a film.

References Cited

UNITED STATES PATENTS 3,049,518   8/1962   Stephens _____ 260—78
3,179,635   4/1965   Frost et al. _____ 260—47

WILLIAM H. SHORT, *Primary Examiner.*

H. D. ANDERSON, *Assistant Examiner.*